(12) United States Patent
Tormasov

(10) Patent No.: US 10,409,688 B2
(45) Date of Patent: Sep. 10, 2019

(54) SYSTEM AND METHOD OF USING ENCRYPTION ALGORITHMS IN P2P ENCRYPTION MODE TO RESTORE INTEGRITY OF DATA

(71) Applicant: Acronis International GmbH, Schaffhausen (CH)

(72) Inventor: Alexander G. Tormasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 210 days.

(21) Appl. No.: 15/429,269

(22) Filed: Feb. 10, 2017

(65) Prior Publication Data

US 2018/0232284 A1    Aug. 16, 2018

(51) Int. Cl.
| | |
|---|---|
| *G06F 12/14* | (2006.01) |
| *G06F 11/14* | (2006.01) |
| *G06F 11/00* | (2006.01) |
| *H04L 9/08* | (2006.01) |

(52) U.S. Cl.
CPC ......... *G06F 11/1448* (2013.01); *G06F 11/00* (2013.01); *G06F 11/1464* (2013.01); *G06F 11/1469* (2013.01); *H04L 9/085* (2013.01); *H04L 9/0894* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 2006/0015945 A1* | 1/2006 | Fields | G06F 21/606 726/27 |
| 2011/0270855 A1* | 11/2011 | Antonysamy | G06F 17/30179 707/756 |

* cited by examiner

*Primary Examiner* — Brandon S Hoffman
(74) *Attorney, Agent, or Firm* — Arent Fox LLP; Michael Fainberg

(57) ABSTRACT

A system and method is disclosed for using encryption algorithms in peer-to-peer encryption mode to restore the integrity of data. An example method is provided for generating a new derivative for a file that has a plurality of existing derivatives that have been stored on servers using an (n,k) algorithm, where the (n,k) algorithm provides that a minimum number k of the derivatives required to restore the file. The method includes accessing, on a server, a first derivative of the existing derivatives and forming a blob for the new derivative based on a modification operation that uses the first derivative. Moreover, the method includes determining a number of times the modification operation has been performed, and if the number of times the modification operation has been performed is equal to the minimum number k, uploading the blob to a server for storage thereon.

20 Claims, 5 Drawing Sheets

SYSTEM AND METHOD OF USING ENCRYPTION ALGORITHMS IN P2P ENCRYPTION MODE TO RESTORE INTEGRITY OF DATA

FIELD OF TECHNOLOGY

The present disclosure generally relates to the field of electronic data backup, and, more specifically, to a system and method for using encryption algorithms in peer-to-peer encryption mode to restore the integrity of data.

BACKGROUND

Distributed data-storage systems ("DSSs") are complicated software solutions that operate over hardware infrastructures consisting of a large number of servers of various designations that are connected together by multiple communication channels. Existing DSSs are subject to various kinds of hardware failures, including total or partial switching off of the electrical supply, network failures that may result in the DSS being divided into separate unconnected segments, disk failures, and the like.

Conventionally, there are two main approaches to ensuring reliability of data storage in conditions of failure, based on the duplication of information and the spreading of data over different components of the distributed data-storage system. The first approach is data replication and the second approach is erasure coding.

In general, data replication is the storage of each block of data (i.e., file or object, depending on the architecture of the data-storage system) in several copies on different disks or different nodes of the system. As a result, replication makes it possible to ensure maximum efficiency of data access, including a significant increase in speed of read access to data frequently used by different clients. However, data replication can be very costly from the perspective of the amount of disk space needed to create the several copies of each block of data.

Moreover, noiseless (or lossless) coding is based on the use of mathematical algorithms that make it possible, to generate n chunks (i.e., data fragments or "derivatives") of a block of data using compression techniques in such a way that any k chunks will be sufficient to recover the initial block of data. Each of the n chunks obtained should be written to a separate disk, and, preferably, to a separate server to ensure high availability of the data. The reliability of a scheme of noiseless coding with parameters n,k (i.e., an "(n,k) scheme") is comparable to the reliability with replication of data with n−k+1 copies of each data block.

The use of noiseless coding makes it possible to reduce considerably the overheads on data storage necessary for data replication—the redundancy of data storage (i.e., including the ratio of the volume of storable data to the volume of useful data) for an (n,k) scheme is equal to n/k (the size of a data chunk is approximately equal to $Size_{Block}/k$, where $Size_{Block}$ is the volume of the initial block of data). The most widely used error-correcting codes in modern software systems of data storage are Reed-Solomon codes and variations, such as Cauchy codes, for example.

In these fault tolerant storage systems, usually any data fragment is split into k+m chunks, where k are the data chunks and m is number of chunks generated on the basis of data chunks. For the generation, the error-correcting codes, such as the Reed-Solomon codes, allow the system to avoid primitive data duplication, but provide a very reliable mechanism that helps to restore all data even if some disks or servers become damaged. For example, to restore any k data chunks, the system should store k+m chunks. If any m chunks are lost, the system can completely restore all the data with remaining k chunks and it does not matter if they are data chunks or generated chunks.

Moreover, the schemes can be different. For example, the system can store k unchanged data chunks and m calculated chunks. Alternatively, the system can store mixed n chunks (as described above), which are combined from k and m chunks in different ways. When archiving the data, the system can save n=k+m chunks on N servers (or disks). Data is to are considered to be saved if all the N servers confirmed the each of N chunks was successfully recorded to storage.

Under the (n,k) scheme, each derivative is unique meaning that there are no duplicates of derivatives. Moreover, it assumed that every existing or potentially possible derivative has a unique number in the range from one to max. In principle, it is possible that this is all built over the Galois field GF ($2^n$), then the maximum number of derivatives limited by possibilities of their numbering in the field.

In certain circumstances, the system may need to create a new derivative with the number i, on one of the servers s, which can be a server currently storing a derivative or a new server. Conventionally, systems create the new derivative i by having the client (who owns the stored data) connect to the system and collect k derivatives. Next, the client will then collect the original file, decrypt it and then generate a derivative i. Finally, the client must then connect to server s and store the derivative i to the server s.

However, there are certain technical disadvantages with this methodology for creating a new derivative i. For example, the client must be online since only the client knows the encryption keys, including keys to the directory, which may be required for storage of data on the servers. Moreover, there may be large overhead since it is necessary to download the entire file, then spend CPU resource on its assembly and the generation of a new derivative, and then upload it to the server. In other words, the client device has too expend significant computing resources.

One possible solution is the separation of the classical encryption and the (n,k) scheme. That is, implementation of the operation of the assembly and disassembly of the file using (n,k) is performed after the usual file encryption. As a result, the client device does not have to be online in this case, but the system still requires a single server that is going to be doing all the work described above with respect to the individual client, and have the same overhead costs, with potentially serious network load.

Accordingly, there is a need for a system and method to restore data integrity for data storage using (n,k) schemes that optimizes assembly time and network load.

SUMMARY

Accordingly, a system and method is disclosed herein for using encryption algorithms in peer-to-peer encryption mode to restore the integrity of data. According to an exemplary aspect, a method is disclosed for generating a new derivative for a file that has a plurality of existing derivatives that have been stored on at least one server using an (n,k) algorithm, wherein the (n,k) algorithm provides that a minimum number k of the derivatives is required to restore the file. In this aspect, the method includes accessing, on the at least one server, a first derivative of the plurality of existing derivatives; forming a blob, by the at least one server, for the new derivative based on a modification operation using the first derivative; determining a number of times the modification operation has been performed; and if the number of times the modification operation has been performed is equal to the minimum number k, uploading the blob to a server for storage thereon.

According to another aspect, the method further includes if the number of times the modification operation has been performed is not equal to the minimum number k, determining if there is an additional derivatives stored on the at least one server; and if there is an additional derivatives stored on the at least one server, modifying the blob, by the at least one server, based on the modification operation using the additional derivative.

According to another aspect, the method further includes incrementing, by the at least one server, the number of times the modification operation has been performed by one; and if the number of times the modification operation has been performed is equal to the minimum number k, uploading the blob to a server for storage thereon.

According to another aspect, the method further includes if the number of times the modification operation has been performed is not equal to the minimum number k, determining if there is an additional derivatives stored on the at least one server; and if there is not an additional derivatives stored on the at least one server, transferring the blob, by the at least one server, to an additional server that is communicatively coupled to the at least one server.

According to another aspect, the method further includes determining if there is an additional derivatives stored on the additional server; and if there is an additional derivatives stored on the additional server, modifying the blob, by the additional server, based on the modification operation using the additional derivative.

According to another aspect, the method further includes incrementing, by the additional server, the number of times the modification operation has been performed by one; and if the number of times the modification operation has been performed is equal to the minimum number k, uploading the blob by the additional server to a server for storage thereon.

According to another aspect, the method further includes selecting the additional server from among a plurality of servers by initiating an auction for the plurality of servers and transmitting the blob to the additional server that wins the auction.

According to another aspect, the method further includes selecting the additional server from among a plurality of servers by selecting the additional server that has a maximum bandwidth with the at least one server.

According to another aspect, the uploading of the blob to the server for storage thereon comprises polling a plurality of servers to identify a server that is willing to store the blob; and uploading the blob to the server that is willing to store the blob and transmitting an electronic payment to the server upon confirmation that the blob is stored thereon.

In one aspect, a system is disclosed for generating a new derivative for a file that has a plurality of existing derivatives that have been stored on at least one server using an (n,k) algorithm, wherein the (n,k) algorithm provides that a minimum number k of the derivatives is required to restore the file. In this aspect, the system includes a processor on the at least one server configured to access a first derivative of the plurality of existing derivatives; form a blob for the new derivative based on a modification operation using the first derivative; determine a number of times the modification operation has been performed; and if the number of times the modification operation has been performed is equal to the minimum number k, upload the blob to a server for storage thereon.

In another aspect, a non-transitory computer readable medium storing computer executable instructions is disclosed for generating a new derivative for a file that has a plurality of existing derivatives that have been stored on at least one server using an (n,k) algorithm, wherein the (n,k) algorithm provides that a minimum number k of the derivatives is required to restore the file. In this aspect, instructions are included for accessing, on the at least one server, a first derivative of the plurality of existing derivatives; forming a blob, by the at least one server, for the new derivative based on a modification operation using the first derivative; determining a number of times the modification operation has been performed; and if the number of times the modification operation has been performed is equal to the minimum number k, uploading the blob to a server for storage thereon.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
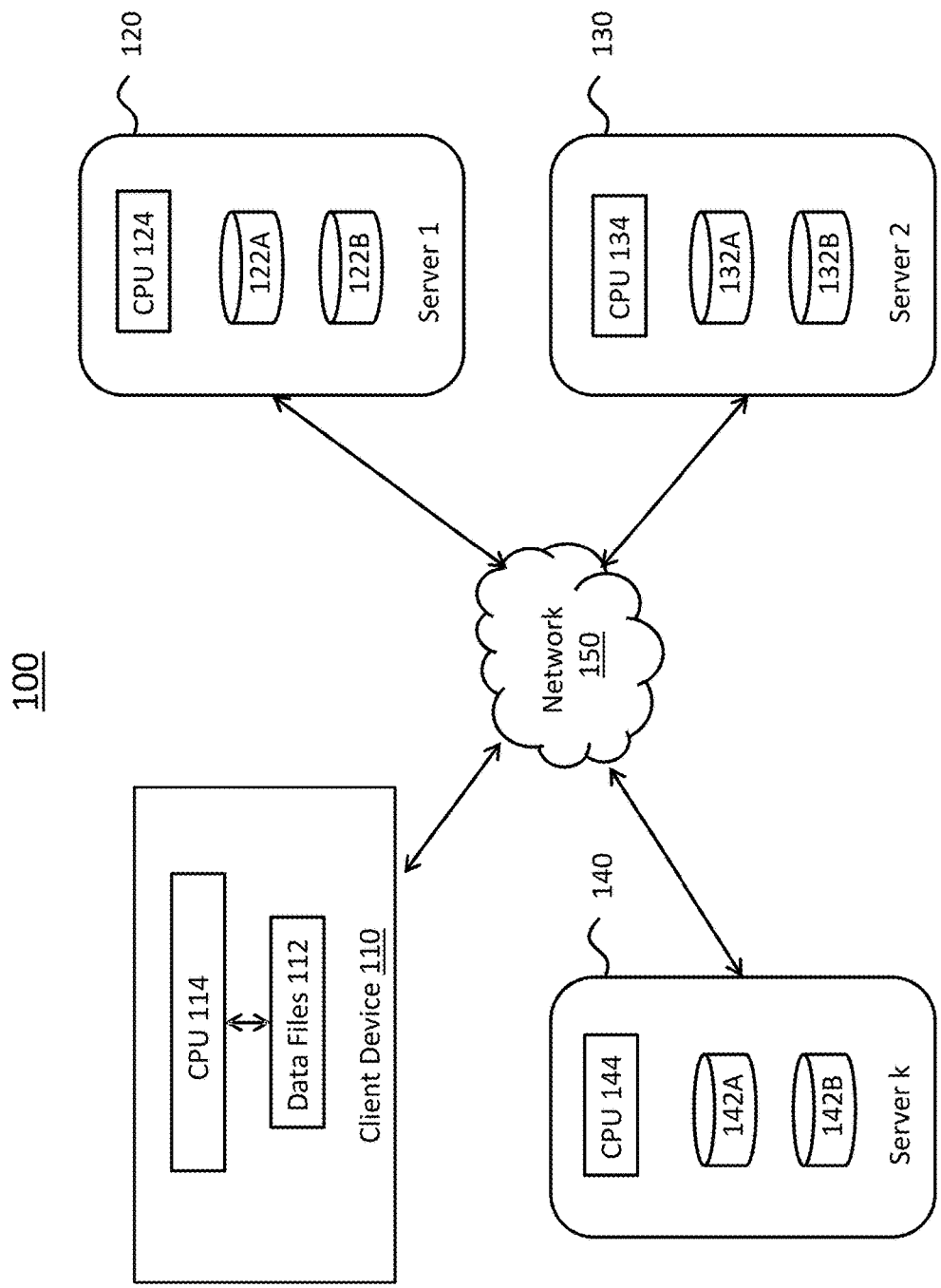
FIG. 1 illustrates is a block diagram for a system for using encryption algorithms in P2P encryption mode to restore the integrity of data according to an exemplary aspect.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects.

FIG. 1 illustrates is a block diagram for a system for using encryption algorithms in P2P (i.e., "peer-to-peer") encryption mode to restore the integrity of data according to an exemplary aspect. As shown, the system 100 can generally be considered a distributed data storage system that includes a client device 110, a plurality of storage nodes, i.e., servers 120, 130, 140, and a network 150. One or more of the servers 120-140 can be in communication with the client device 110 and also in communication with each other through the network 150.

According to the exemplary aspect, the client device 110 may be any type of computing client device, such as a laptop, a desktop, smartphone or the like. In an alternative aspect, the client device 110 can be a separate server configured to manage the distributed data-storage of the other servers 120-140. As shown, the client device 110 includes one or a plurality of data files 112 in electronic memory and a computer-processing unit ("CPU") 114. Other common components (e.g., network interfaces and the like) are included in the client device 110, but have not been shown herein so as to not unnecessarily obscure the aspects of the exemplary system and method. Moreover, it should be appreciated that while the exemplary aspect is described as being implemented on single client device 110, the system and method can also be implemented on multiple computers according to an alternative aspect. Thus, for the purpose of high availability, the system can include several computers with such services deployed and services have some consensus protocol to communicate and agree on each other action.

According to the exemplary aspect, the client device 110 can store one or more blocks of data from data files 112 in the system using the (n,k) scheme described above by distributing chunks, i.e., "derivatives", of the data across the disks of the storage nodes, i.e., servers 120, 130 and 140. It should be appreciated that the derivatives are fragments of the original block of data (e.g., a file F) according to the (n,k) scheme.

As generally shown, each of the servers 120, 130 and 140 also comprises CPUs and a plurality of nodes and/or disks for data storage. For example, server 120 includes disks 122A and 122B and CPU 124, server 130 includes disks 132A and 132B and CPU 134 and server 140 includes disks 142A and 142B and CPU 144. It should be appreciated that three servers and two disks per server is shown according to the illustrated aspect, but that the exemplary aspect is in no way intended to be limited to this number of servers and/or disks. In particular, for purposes of this disclosure, it is assumed that there can a number of servers $S_j$ where j=1 . . . k. Thus, in the exemplary aspect, server 120 is Server 1, server 130 is Server 2 and server 140 is Server k.

According to the exemplary aspect, the CPUs of each server (i.e., CPUs 124, 134, and 144) are configured to execute a data management module that includes software code (e.g., processor executable instructions) in memory, which may be configured to execute/facilitate the algorithms described herein for distributed data storage and management. In this aspect, servers 120-140 are configured to form a P2P computing network as a distributed application architecture that is capable of partitioning the tasks/workloads between the servers 120-140. In other words, the servers 120-140 form a peer-to-peer network of the storage nodes. By doing so, each of the servers 120-140 advantageously provide a portion of their resources, e.g., processing power by the respective CPUs, directly available to the other network participants, without the need for central coordination by a central server or stable host. In one exemplary aspect, client device 110 can form a storage node with the P2P network.

Furthermore, according to the exemplary aspect, network 150 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 150 may employ various well-known protocols to communicate information amongst the network resources. In one aspect, the network 150 can be part of the Internet or intranet using various communications infrastructure such as Ethernet, WiFi and the like.

Furthermore, it is contemplated that each of the servers 120, 130 and 140 can generally include hardware and software components configured to manage various storage resources within the computing environment as will be described in more detail below. According to the exemplary aspect, each of the disks (e.g., 122A, 122B, 132A, 132B, 142A and 142B) can be a typical data storage device (e.g., hard disk drives, optical drives, magnetic tape drives and/or the like). Thus, according to the exemplary aspect, the servers 120, 130 and 140 collectively form the data distributed system as the P2P network that is provided to facilitate temporary and/or permanent storage of computer data according to the (n,k) scheme. The computer data may be any type of electronic, digital data generated and/or stored by a computer. For example, the computer data can represent text data, executable program code, or any other type of digital data. It is further contemplated according to one aspect that the servers 120-140 can be provided as forming an online/remote file storage service (e.g., a cloud computing service) in one aspect, but alternatively can be incorporated into a local area network or the like as should be appreciated to those skilled in the art.

For purposes of this disclosure, the client device 110 is configured to initially store data in the distributed storage system, and, in particular, across one or more of the nodes/disks shown in FIG. 1. According to an exemplary aspect, the client device 110 can store a file F having a size S (i.e., an object of storage) as the consecutive order of binary storage units (e.g., bits, bytes, sectors, clusters, etc.). Applying the (n,k) scheme for distributed storage of file F, the system can initially store k chunks (also referred to as "derivatives") with m number of chunks that will be sufficient to recover the initial file F. Preferably, each of the k chunks should be written to a separate disk, and, preferably, to a separate server to ensure high availability of the data, although two or more derivatives can be stored in the same node and even all derivatives k can be stored on a single node.

Thus, according to an exemplary embodiment, the system (the term "system" refers to client device 110, which can be another server, for example) can employ an algorithm that can initially create a set of k "derivatives" $d_i$ of file F that can be distributed across the servers 120-140 (i.e., servers 1, 2 . . . k) according to conventional techniques (e.g., randomly, even distribution, etc.). Moreover, according to one exemplary aspect, the size of each of the derivatives $d_i$ is identical and equal to S/k: size (di)=S/k (rounding to the nearest binary storage units), where S is the total size of file F. The derivatives $d_i$ could have varying sizes according to alternative aspects. In the exemplary aspect, each of derivatives $d_i$ is stored entirely on one of the nodes, wherein each node can contain from 0 to n−1 derivatives. Thus, to restore a file F, the system (e.g., client device 110) can access every k derivative from any nodes and apply them to an algorithm to reassemble the file F according to the (n,k) scheme.

Subsequently, the system 100 determines that a new derivative (e.g., derivative i) needs to be created for file F. For example, as described above, k blocks is the minimum number of blocks necessary for recovery. For purposes of dynamic management of data recovery, the system or a system administrator, etc., can elect to add/create additional blocks, e.g., k+1 or 2k blocks to increase data recoverability and the like. As further described above, according to conventional techniques, the client device 110 would be forced to collect k derivatives from the storage nodes, recreates and decrypts the file F, and then generate the derivative i. The exemplary system and method utilizes the P2P network formed by servers 120-140 to distribute the operations between the different servers to optimize assembly time and network load.

Figure 2:
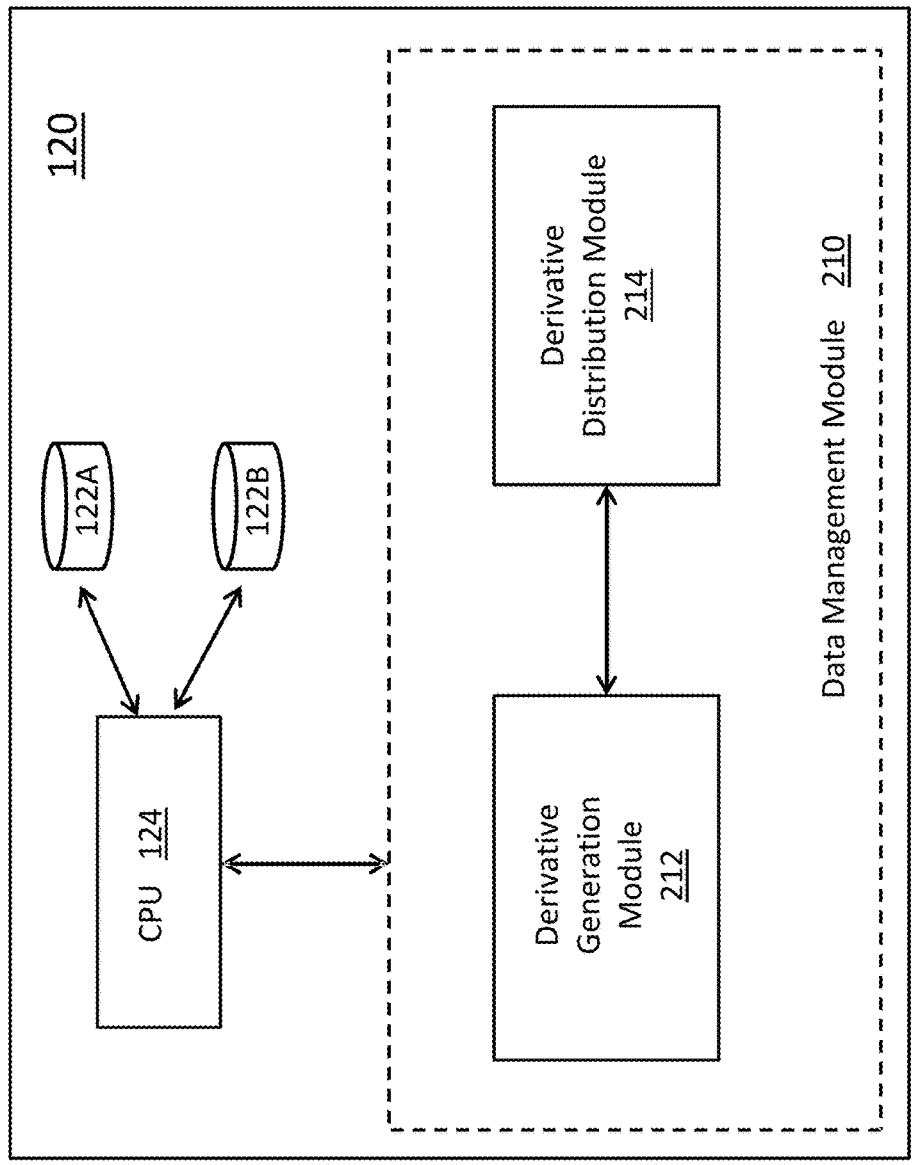
FIG. 2 illustrates a block diagram of server 120 for using encryption algorithms in P2P encryption mode to restore the integrity of data according to an exemplary aspect.

In particular, each server 120-140 is configured to execute a data management module that includes software code (e.g., processor executable instructions) in memory, which may be configured to execute the operations to create/restore a new derivative i for file F. Specifically, FIG. 2 illustrates a block diagram of server 120 for using encryption algorithms in P2P encryption mode to restore the integrity of data according to an exemplary aspect. It should be appreciated that while FIG. 2 illustrates an exemplary diagram for server 120, additional servers in the P2P network (e.g., servers 130 and 140) have the same or similar configuration of components.

Thus, server 120 shown in FIG. 2 illustrates a more detailed view of the server 120 of system 100 described above with respect to FIG. 1. In the exemplary aspect, the server 120 includes CPU 124 and memory (i.e., disks 122A and 122B). Moreover, the server 120 includes a data management module 210 that is configured to perform the algorithms described below for data storage and management of a file F according to the exemplary aspects.

As shown in FIG. 2, the data management module 210 can be composed of a plurality of modules, i.e., derivative generation module 212 and derivative distribution module 214. As used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

For purposes of the disclosure below with respect to the exemplary algorithms, the disclosure may in some places generally refer to the server 210 (and servers 130 and 140) and/or the data management module 210 as performing the various steps, but it should be appreciated that the applicable modules shown in FIG. 2 are provided to perform such steps according to an exemplary aspect. For example, the derivative generation module 212 is provided to generate/restore a new derivative i for file F and derivative distribution module 214 is configured to selected the nodes in the P2P network for storage of the derivative i of file F. For example, once a new derivative i for file F is created for the derivative generation module 212, the derivative distribution module 214 is configured to select a node in the system (e.g., server S) to store the new derivative i to achieve load balance, reliability, access pattern, and the like, for example.

Accordingly, to the exemplary aspect, the derivative generation module 212 of each server 120-140 is configured to generate a "blob" $\{d_i\}$ that is an object that contains the data that is gradually recreated for the derivative i, for example. As used herein, the term blob is short for a binary large object, which is a collection of binary data stored as a single entity in the database management system, i.e., the P2P network including servers 120-140.

In this aspect, the derivative generation module 212 of each server 120-140 is configured to generate the "blob" $\{d_i\}$ through step by step modification procedure/operation R (i, $\{d^*i\}$, m, $\{dm\}$, l) for the creation of derivative i, where the inputs for the modification procedure/operation R are:

i—the number generated by the derivative;
$\{d^*i\}$—the current reconstituted blob of the derivative (e.g., size 1/k of the original file), modifiable;
m—number of derivative to be used in the current step for recreation;
$\{dm\}$—blob m-th derivative, not modified; and
l—the step number (from 1 to k, where k corresponds to the number of servers used during generation of the derivative i).

Thus, according to the exemplary aspect, k steps are performed by the plurality of servers (each by its respective derivative generation module 212) to generate the blob $\{d_i\}$, which is the object where data is gradually recreated for the derivative i. In the exemplary aspect, since there are servers 1 . . . k and the algorithm employs k steps, it should be appreciated that the modification operation R (i, $\{d^*i\}$, m, $\{dm\}$, l) is performed by each server during the process before the blob $\{d_i\}$ is finalized. In other words, the current reconstituted blob $\{d^*i\}$ is generated by a first server and then transmitted to a second server where it is continuously modified/added to until all servers in the sequence of servers have executed the operation R on the reconstituted blob $\{d^*i\}$ to form the blob $\{d_i\}$ for derivative i.

As noted above, as an example, the system 100 can include a sequence of the servers Sj, where j=1 . . . k, with at least one derivative of file F stored on each server (e.g., servers 120-140). Moreover, according to the exemplary aspect, a new derivative i needs to be created and restored on a server s, where s can be one of the servers that currently stores a derivative or is another server that is within the P2P network, but does not currently store a derivative. It is noted that server s is selected according to internal administrative policies. For example, server s can be the server that does not currently have any derivatives stored thereon and is the server that is communicatively coupled to server k with the highest transfer rate between each other.

Initially, a first server is selected (i.e., j=1) to perform the operation R. For example, in one aspect, if client device 110 determines a derivative i needs to be created for file F, the first server in the sequence of servers Sj is prompted or initiated to perform operation R. For example, a system manager (e.g., a managing or controlling server of the system) may store a topology of the system and manage the process including identifying and instructing the first server to begin the derivative recreation process. Thus, in the exemplary aspect, the derivative generation module 212 of server 1 (which can be server 120, for example) first empties (i.e., zeroes) a binary object to be for the blob $\{d^*i\}$. In other words, blob $\{d^*i\}$ is initially an empty object and then data is gradually added to create/restore the derivative i. Moreover, in this example, q=1, meaning that q is the initial step in the sequence of operations to form/restore derivative i. Thus, server 1 performs the modification operation of R (i, {d*i}, m, {dm}, q), where m is equal to the number of the derivative stored on this server 1.

Next, the derivative distribution module 214 determines whether q (i.e., the current step number) is equal to k. In one aspect, each server in the sequence Sq of servers includes memory that stores, among other information, the value k indicative of the total number of servers in the sequence of servers Sq. Moreover, each time the modification operation is performed, the number q is incremented by 1 by the current server, for example. If the derivative distribution module 214 determines that q=k (meaning the sequence of servers is complete), then the derivative distribution module 214 causes the respective server to upload the reconstituted blob {d*i} to server s (previously determined/identified) to be stored therein and the algorithm is finished.

Additionally (or alternatively), the derivative generation module 212 further determines if the current server (i.e., server Sj) has a derivative p in server storage, such as disk 122A or 122B, that has not previously been used in formation of the derivative i. If so, then the step q is increased by one, i.e., q=q+1, and the server Sj performs the operation R (i, {d*i}, p, {dp}, q) using the derivative q to be included in the reconstituted blob {d*i}. Upon execution of this operation by the derivative generation module 212, the derivative distribution module 214 then again determines if q=k. If so, the derivative distribution module 214 then causes the respective server to upload the reconstituted blob {d*i} to server s (previously determined) to be stored therein and the algorithm is finished.

If the current server j does not have any unused derivatives and j does not equal k (meaning there are additional servers in the sequence Sj of servers), then the process moves to the next server j=j+1, which can be, for example, server 2 (i.e., server 130). In this instance, the derivative distribution module 214 causes the reconstituted blob {d*i} to be passed or transmitted to the new server Sj+1. The new server (now referred to as Sj, i.e., the current server) then performs the modification operation R for each derivative stored therein to modify the reconstituted blob {d*i} and checks whether j=k. This process is continued through the entire sequence Sq of servers until j=k. Finally, if the derivative distribution module 214 for the current server determines that q=k (meaning the sequence of servers is complete), then the derivative distribution module 214 of that server uploads the reconstituted blob {d*i} for derivative i to server s (previously determined) to be stored therein and the algorithm is finished. Advantageously, each server in the sequence Sq of servers provides a portion of their resources, e.g., processing power by the respective CPUs, directly available to the other network participants, without the need for central coordination by a central server or stable host. Moreover, there is no need for the client device 110, who owns file F, to be online and in communication with the P2P network for the derivative i to be created.

Figure 3A:
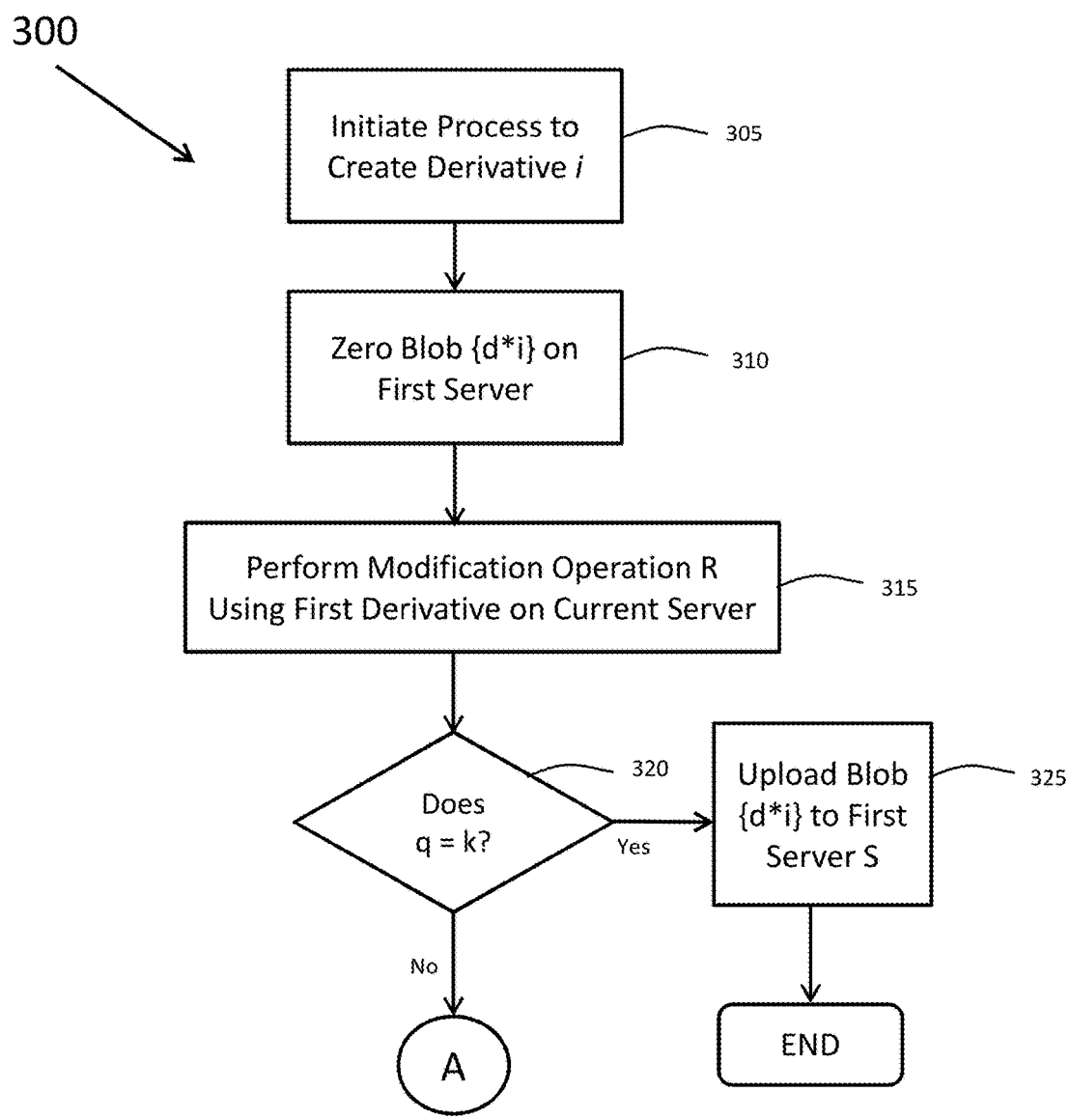
FIGS. 3A and 3B illustrate a flowchart for a method for using encryption algorithms in P2P encryption mode to restore the integrity of data according to an exemplary aspect.
Figure 3B:
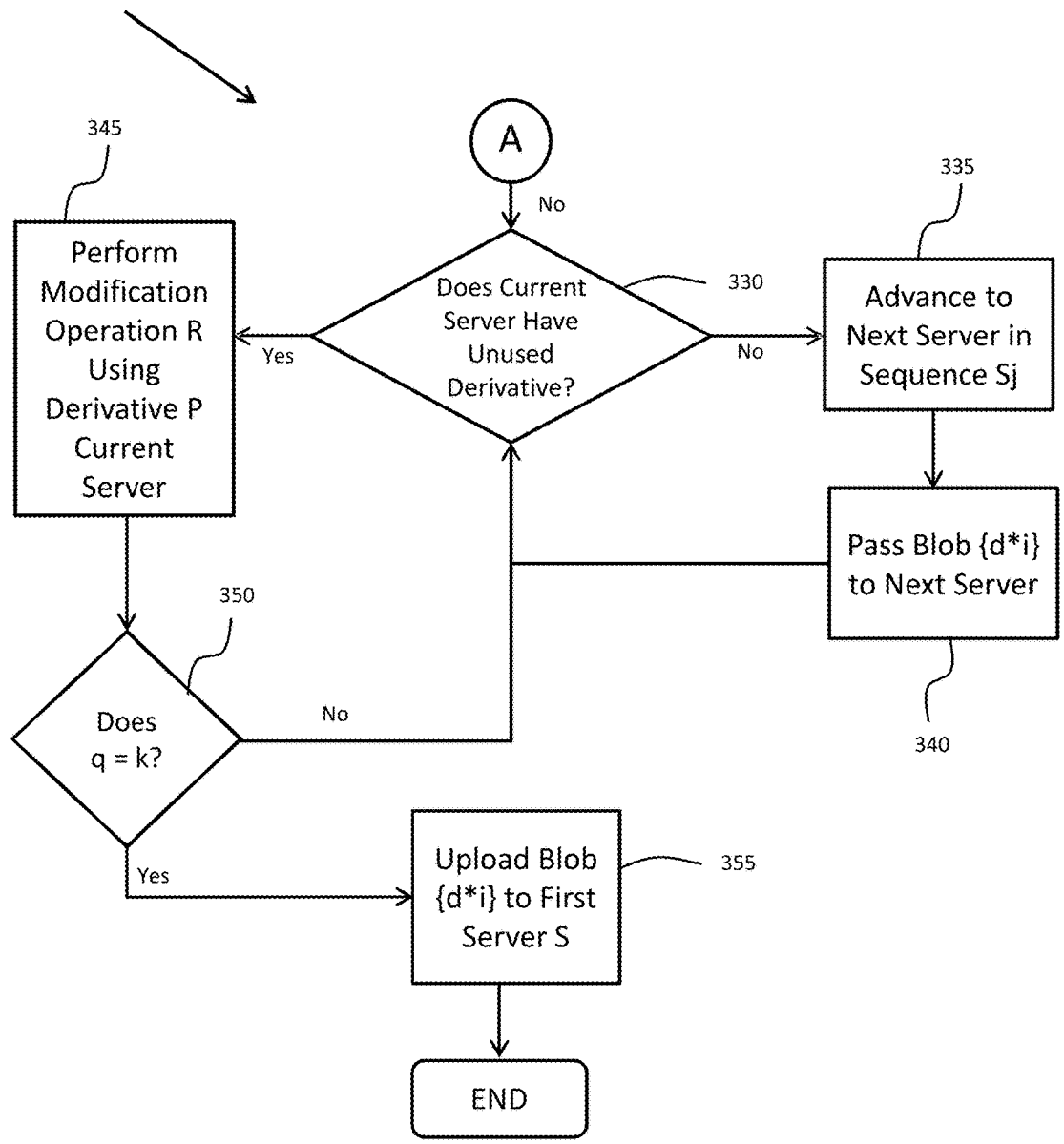

FIGS. 3A and 3B illustrate a flowchart for a method for using encryption algorithms in P2P encryption mode to restore the integrity of data according to an exemplary aspect. It should be understood that the following exemplary method utilizes the system 100 and components described above and makes reference to them as follows.

As shown, initially at step 305, the process is initiated to create/restore a derivative i of a file F, for example. It should be appreciated that the method begins with state of the P2P network of servers having previously stored k derivatives of a file F on the plurality of servers in the system 100. At step 310, a first server of a sequence Sq of servers is selected with a blob {d*i} zeroed on the server. Then, at step 315, an existing derivative is identified on the current server j and modified using the modification operation R as defined above.

Next, at step 320, the current server j determines whether q (i.e., the step number) is equal to k (i.e., the total number of servers in the sequence of servers Sq). If q is determined to equal k at step 320, the method proceeds to step 325 where the derivative distribution module 214 then causes the respective server to upload the reconstituted blob {d*i} to server s (previously determined) to be stored therein and the algorithm is finished.

Alternatively, if q does not equal k, then the method proceeds to step 330 as shown in FIG. 3B. In particular, at step 330, the current server determines whether there are any unused derivatives of file F stored therein (e.g., derivative p). If so, the method proceeds to step 345 where the current server performs the modification operation R of blob {d*i} using the derivative p. After execution of this modification operation, the method proceeds to step 350 where the current server again determines if q=k (same as step 320). If q=k, the method proceeds to step 355 where the derivative distribution module 214 of the current server then causes the respective server to upload the reconstituted blob {d*i} to server s (previously determined) to be stored therein and the algorithm is finished. Alternatively, if q does not equal k, the method returns to step 330.

Referring further to step 330, if the current server determines that there are no unused derivatives of file F on that server, the method proceeds to step 335 in which the operation sequence is advanced to the next server in the sequence Sj of servers. In doing so, at step 340, the blob {d*i} is passed/transmitted from the current server j to the next server j+1. Thus, as further shown, the method then returns again to step 330 where the current server determines if there are any unused derivatives of file F in the creation of derivative i. This process is then repeated until the current server (e.g., server k of FIG. 1) determines that q=k at step 350. At this point, the derivative distribution module 214 of the current server causes the respective server to upload the reconstituted blob {d*i} to server s to be stored therein and the algorithm is finished.

Thus, it should be appreciated that according to the exemplary system and corresponding method/algorithm, the generation of the derivative i can be considered a process having "k" stages. In other words, the blob is initially created (e.g., zeroed) and the algorithm R is applied to the blob in which the existing blob content is used and one of the existing derivatives is provided as an input. This process is repeated with different existing derivatives on the same blob exactly k times. Thus, the blob effectively accumulates changes after each algorithm R is applied to the blob. After k times of the modification operation R, the blob effectively becomes the derivative, i.e., after final application of the algorithm R.

For illustrative purposes only, support the system is currently storing 8 derivatives d each comprising 8 bits. In this example, the system and method can create a blob with 8 bits (i.e., k=8) of random data (or 0-th, does not matter for the following illustrative algorithm). Then for each derivative, the system can take an XOR operation of all 8 bits of the derivative and replace 1 appropriate bit in the blob. Then the algorithm replaces 8-th bit in blob, the blob effectively becomes the derivative d. Thus, the blob is first zeroed as {xxxxxxxx}. After the first modification, the blob is {Bxxxxxxx}, after the second modification, the blob is {BBxxxxxx} and so forth. After the eighth modification operation, the blob is {BBBBBBBB}, such that newly created derivative is complete, where each B is created from the appropriate derivative. Again, it is reiterated that this algorithm is only provided as an example for derivative creation using the disclosed algorithm, but does not contemplate achieve any particular (n,k) scheme requirements, as described above.

In one exemplary aspect, the method described above for creating/restoring blob $\{d^*i\}$ for derivative i is performed with the sequence Sj of servers determined to provide an optimal solution, i.e., by minimizing the total time of the operation including data transfer time (including channel load) between the servers and their local assembly. Moreover, another criterion for optimality can be a common "extra" traffic system.

For example, in one exemplary aspect, if a derivative is stored on each server in the P2P network, the current recreated blob $\{d^*i\}$ will need to be transferred between servers and, thus, the overall excess traffic will be equal to the size of the file. In this situation, the system is configured to select only servers with a maximum bandwidth between each other, and at each step to choose from the remaining servers the one that has highest data transfer rate. For example, the data management module 210 of the current server performed the modification operation R can be configured to dynamically evaluate the transfer rates with other servers in the network as the current loads, or statically, as a predetermined limit or average performance pairwise communication channel. When the current server needs to pass the recreated blob $\{d^*i\}$ to the next server in the sequence Sj, the data management module 210 of that current server will select the connected server with the highest data transfer rate.

In a refinement of this aspect, if one or more of the servers store more than 1 derivative for file F, the disclosed algorithm can also take this configuration into account. For example, for the current server, the data management module 210 can be configured to estimate the time remaining for the completion of its working, provided the system passes this server the turn to perform the modification operation R. In this case, the transmission time of the currently recreated blob $\{d^*i\}$ on the selected server will be proportional to the current bandwidth, while the volume of all work on all servers will be the same (in terms of time, it may vary if there is a different performance or load), but if there is more than one derivative on a server, then the total number of servers in the chain (i.e., the sequence Sj) is reduced, and, therefore, the amount of data transmitted over the network 150 is also reduced. In the extreme case, if one server already has k derivatives, then the need to transfer data within the network is absent, except for the transmission of the blob $\{d^*i\}$ only to the server s at the end of the algorithm.

Thus, according to the exemplary aspect, a simple algorithm can be formulated by the system to minimize the execution time of operations, or overhead, and on the basis of its already choose servers. Moreover, the creation of algorithm for assembly and disassembly for (n,k) scheme and recovery algorithm R based on it.

Moreover, it should be appreciated that for implementation on the basis of smart contracts and independent servers, there is needed an incentive for the servers to participate in the recreation operation described above. Thus, according to one exemplary aspect, verification of the performance of the distribution conditions (i.e., redundancy) of derivatives on the plurality of servers by outside oracle, for money. In one aspect, the managing device (e.g., device 110, which can be a server) can periodically poll the servers in the P2P network and search for willingness to store a derivative of some file. In this case, the storage of each server receives a micropayment for storage upon receiving the derivative and confirming storage thereon, for example. Moreover, it is possible to ask for a piece, and can only request data from it, that require an update. In this aspect, there may be a problem to combat cheaters, i.e., those who, for example, only stores a hash of the data, but not the data itself. This situation can require the fulfilment of intransitive hashing operation—for example, the calculation of salt starting from a given moment (although verification of the response in this approach is complicated). It should be appreciated that in one aspect, this process may be organized as a contract that runs on time.

In an alternative aspect, each server can receive payment for participation in the process of assembling a new derivative that will be used for optimization or to recover lost derivative during a crash. In case of failure of conditions as described above, the process can be started that includes, for example, an auction for the implementation of operations with the search among available servers wishing to participate in the process. Moreover, in one aspect, the proposed approach does not use homomorphic encryption and the methodology allows servers to see the assembled file (usually encrypted). Alternatively, by using homomorphic encryption for the algorithm described above, each server in the sequence of servers Sj is configured to perform the steps of modifying blob $\{d^*i\}$ to recreate derivative i without knowing the data content.

Figure 4:
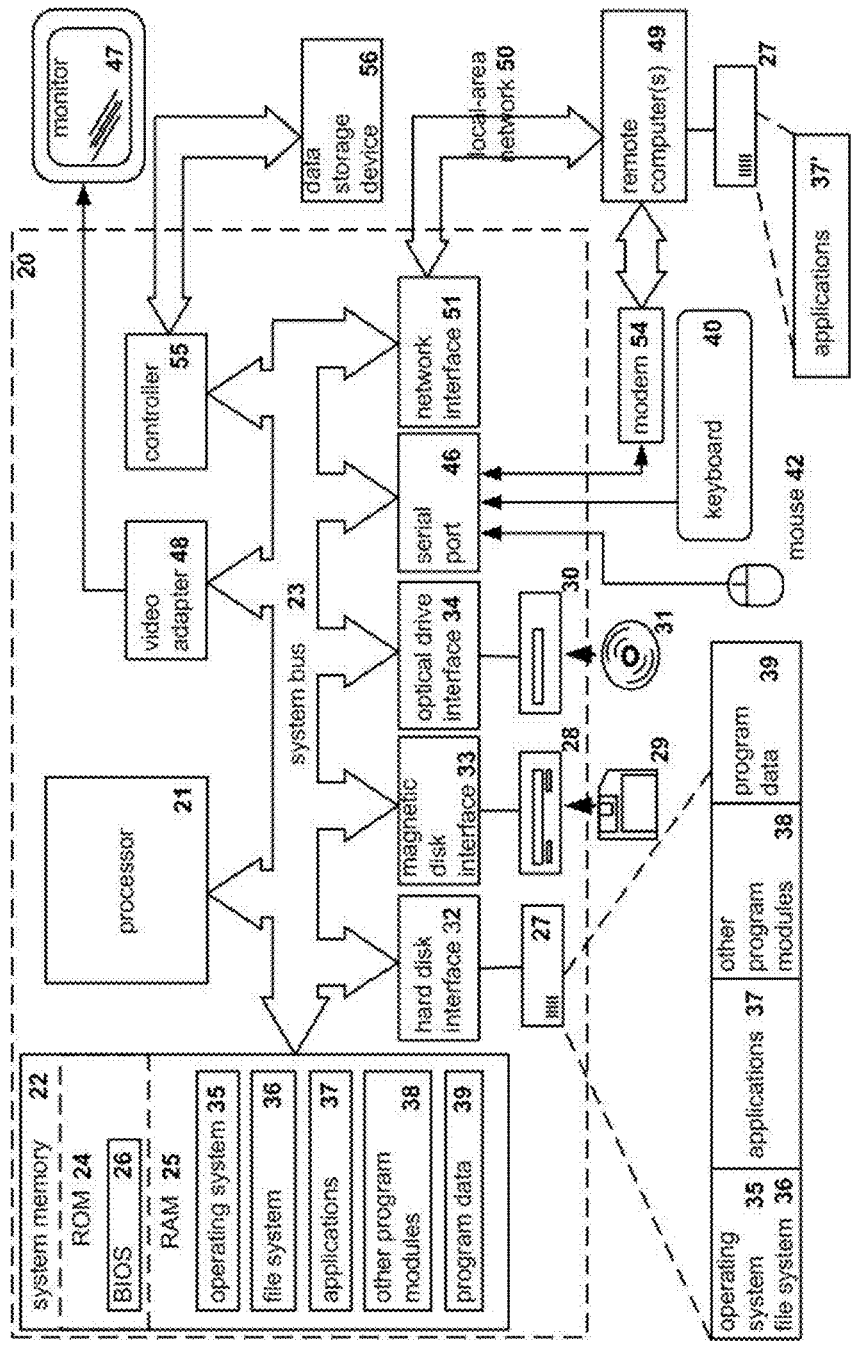
FIG. 4 illustrates an example of a general-purpose computer system on which the disclosed systems and method can be implemented.

Finally, FIG. 4 illustrates an example of a general-purpose computer system (which may be a personal computer or a server) on which the disclosed systems and method can be implemented according to an example aspect. It should be appreciated that the detailed general-purpose computer system can correspond to client device 110 and any of servers 120-140 described above with respect to FIG. 1. Moreover, the remote computer(s) 49, as described below, can correspond to any of the nodes in the P2P network as discussed above with respect to the exemplary system and method.

As shown in FIG. 5, the computer system 20 includes a central processing unit 21, a system memory 22 and a system bus 23 connecting the various system components, including the memory associated with the central processing unit 21. The central processing unit 21 can correspond to the CPU 124 and the system memory 22 can correspond to disks 122A and/or 122B of server 120, as an example, as shown in FIG. 1. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for generating a new derivative for a file that has a plurality of existing derivatives stored on one or more servers using an (n,k) algorithm, wherein k is a minimum number of derivatives required to restore the file, the method comprising:
    accessing, on a server, an existing derivative of the file stored on said server;
    performing, by the server, a modification operation on the existing derivative to generate a blob for the new derivative;
    determining a number of times the modification operation has been performed;
    when the number of times the modification operation has been performed is not equal to k and there is an additional existing derivative stored on at least one server of the one or more servers, performing, by said server, the modification operation on the blob using the additional existing derivative and incrementing by one the number of times the modification operation has been performed until the modification operation has been performed k times; and
    when the modification operation has been performed k times, uploading the blob to a server for storage thereon.

2. The method of claim 1, further comprising:
    when the modification operation has not been performed k times and there is no additional existing derivative stored on the at least one server, by the at least one server, transferring the blob to an additional server that is communicatively coupled to the at least one server.

3. The method of claim 2, further comprising:
    determining if there is an additional derivative stored on the additional server; and
    when there is an additional derivative stored on the additional server, modifying the blob, by the additional server, based on the modification operation using the additional derivative.

4. The method of claim 3, further comprising:
incrementing by one, by the additional server, the number of times the modification operation has been performed; and
when the modification operation has been performed k times, uploading the blob by the additional server to a server for storage thereon.

5. The method of claim 2, further comprising selecting the additional server from among a plurality of servers by initiating an auction for the plurality of servers and transmitting the blob to the additional server that wins the auction.

6. The method of claim 2, further comprising selecting the additional server from among a plurality of servers by selecting the additional server that has a maximum bandwidth for communicating with the at least one server.

7. The method of claim 1, wherein the uploading of the blob to the server for storage thereon comprises:
polling a plurality of servers to identify a server that is willing to store the blob; and
uploading the blob to the server that is willing to store the blob and transmitting an electronic payment to the server upon confirmation that the blob is stored thereon.

8. A system for generating a new derivative for a file that has a plurality of existing derivatives stored on one or more servers using an (n,k) algorithm, wherein k is a minimum number of derivatives required to restore the file, the system comprising:
a processor on a server configured to:
access an existing derivative of the file stored on said server;
perform, by the server, a modification operation on the existing derivative to generate a blob for the new derivative;
determine a number of times the modification operation has been performed;
when the number of times the modification operation has been performed is not equal to k and there is an additional existing derivative stored on at least one server of the one or more servers, perform, by said server, the modification operation on the blob using the additional existing derivative and increment by one the number of times the modification operation has been performed until the modification operation has been performed k times; and
when the modification operation has been performed k times, upload the blob to a server for storage thereon.

9. The system of claim 8, wherein the processor is further configured to:
when the modification operation has not been performed k times and there is no additional existing derivative stored on the at least one server, by the at least one server, transferring the blob to an additional server that is communicatively coupled to the at least one server.

10. The system of claim 9,
wherein a processor of the additional server determines when there is an additional derivative stored thereon, and
wherein, when there is an additional derivative stored on the additional server, the processor of the additional server is configured to modify the blob based on the modification operation using the additional derivative.

11. The system of claim 10,
wherein the processor of the additional server is configured to increment by one the number of times the modification operation has been performed; and
when the modification operation has been performed k times, the additional server is configured to upload the blob to a server for storage thereon.

12. The system of claim 9, wherein the processor is further configured to select the additional server from among a plurality of servers by initiating an auction for the plurality of servers and transmitting the blob to the additional server that wins the auction.

13. The system of claim 9, wherein the processor is further configured to select the additional server from among a plurality of servers by selecting the additional server that has a maximum bandwidth for communicating with the at least one server.

14. The system of claim 8, wherein the processor is further configured to upload the blob to the server for storage thereon by:
polling a plurality of servers to identify a server that is willing to store the blob; and
uploading the blob to the server that is willing to store the blob and transmitting an electronic payment to the server upon confirmation that the blob is stored thereon.

15. A non-transitory computer readable medium storing computer executable instructions for generating a new derivative for a file that has a plurality of existing derivatives stored on one or more servers using an (n,k) algorithm, wherein k is a minimum number of derivatives required to restore the file, including instructions for:
accessing, on a server, an existing derivative of the file stored on said server;
performing, by the server, a modification operation on the existing derivative to generate a blob for the new derivative;
determining a number of times the modification operation has been performed;
when the number of times the modification operation has been performed is not equal to k and there is an additional existing derivative stored on at least one server of the one or more servers, performing, by said server, the modification operation on the blob using the additional existing derivative and incrementing by one the number of times the modification operation has been performed until the modification operation has been performed k times; and
when the modification operation has been k times, uploading the blob to a server for storage thereon.

16. The non-transitory computer readable medium according to claim 15, further including instructions for:
when the modification operation has not been performed k times and there is no additional existing derivative stored on the at least one server, by the at least one server, transferring the blob to an additional server that is communicatively coupled to the at least one server.

17. The non-transitory computer readable medium according to claim 16, further including instructions for:
determining if there is an additional derivative stored on the additional server; and
when there is an additional derivative stored on the additional server, modifying the blob, by the additional server, based on the modification operation using the additional derivative.

18. The non-transitory computer readable medium according to claim 17, further including instructions for:
incrementing by one, by the additional server, the number of times the modification operation has been performed; and when the modification operation has been performed k times, uploading the blob by the additional server to a server for storage thereon.

19. The non-transitory computer readable medium according to claim 16, further including instructions for:
selecting the additional server from among a plurality of servers by initiating an auction for the plurality of servers and transmitting the blob to the additional server that wins the auction.

20. The non-transitory computer readable medium according to claim 16, further including instructions for:
selecting the additional server from among a plurality of servers by selecting the additional server that has a maximum bandwidth for communicating with the at least one server.

* * * * *